H. T. PASCOE.
NUT LOCK.
APPLICATION FILED JUNE 7, 1920.
1,366,829.
Patented Jan. 25, 1921.
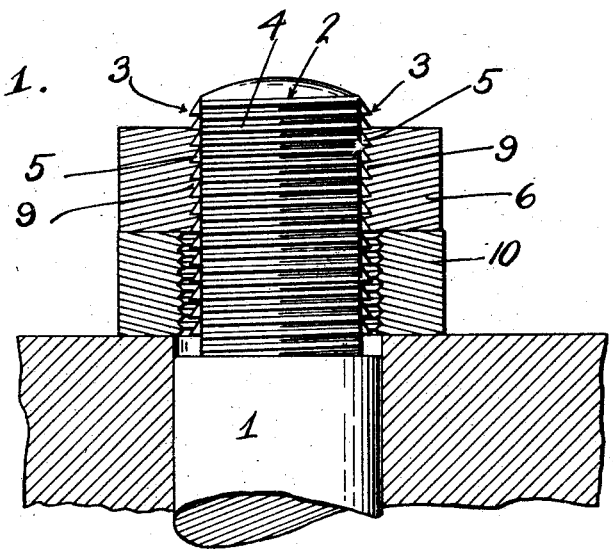
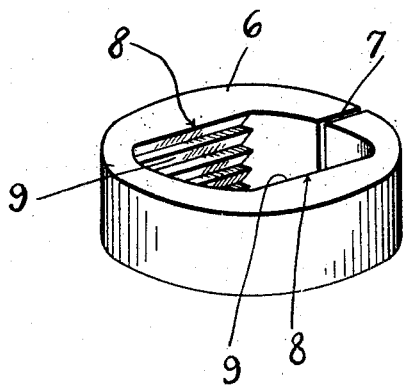
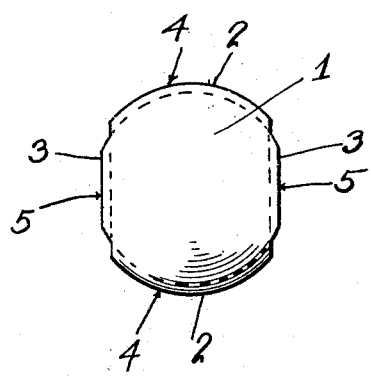
H. T. Pascoe INVENTOR
BY *Victor J. Evans*
ATTORNEY
WITNESS:

UNITED STATES PATENT OFFICE.

HENRY T. PASCOE, OF YOUNG, ARIZONA.

NUT-LOCK.

1,366,829.  Specification of Letters Patent.  Patented Jan. 25, 1921.

Application filed June 7, 1920. Serial No. 387,013.

*To all whom it may concern:*

Be it known that I, HENRY T. PASCOE, a citizen of the United States, residing at Young, in the county of Gila and State of Arizona, have invented new and useful Improvements in Nut-Locks, of which the following is a specification.

This invention relates to an improved bolt and lock nut and the principal object of the invention is to provide means whereby the nut will be held against rotary movement on the bolt.

Another object of the invention is to so form the bolt that the usual nut may be placed thereon in the usual manner while holding the lock nut against rotation and against longitudinal movement on the bolt.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing my improved bolt and nut and with the ordinary nut on the bolt.

Fig. 2 is a perspective view of the lock nut.

Fig. 3 is a view of the screw threaded end of the bolt.

In these views 1 indicates the bolt which is provided with the screw threaded portion 2, this portion having the oppositely arranged flattened portions 3, the screw threads 4 being located on the unflattened parts. Teeth 5 are formed on the flattened portions. The lock nut 6 is formed of spring material and is split as at 7 and this nut is provided with some flattened portions 8 for engaging the flattened portions on the bolt, the faces of these parts being provided with teeth 9. The rounded parts of the interior walls of this lock nut are smoothed so that they can slip over the screw threaded portions of the bolt. 10 indicates the usual form of nut which is adapted to be screw threaded on the bolt, the screw threads of the nut engaging the screw threads 4 of the bolt, the nut passing over the flat sides of the bolt as will be understood. In placing the lock nut on the bolt it is simply placed on the end of the bolt and forced downwardly, the nut opening to permit the teeth thereon to slide over the teeth on the bolt. The flattened parts engaging with each other will prevent rotary movement of the lock nut and the formation of the teeth will prevent the nut from being withdrawn from the bolt or vise versa. When it is desired to remove the lock nut a wedge tool is inserted between the split ends thereof and the nut sprung open to force the teeth out of engagement with each other and permit said nut to be slipped over the end of the bolt.

It is thought from the foregoing description that the advantages and novel features of my invention will be readily apparent.

I desire it to be undertsood that I may make changes in the construction and in the combination and arrangement of the several parts. provided that such changes fall within the scope of the appended claims.

What I claim is:—

1. In combination with a bolt having flattened portions thereon, a lock nut having flattened portions on its interior wall for engaging the flattened parts on the bolt and interlocking means on said flattened portions for preventing withdrawal of the nut from the bolt.

2. In combination with a bolt having a flat portion thereon provided with teeth, a split nut having a flat portion thereon provided with teeth for engaging the teeth on the bolt.

3. In combination with a bolt, oppositely arranged flattened portions on its screw threaded portion, teeth on said flattened portion, a split nut having flat portions on its interior wall for engaging the flat portions of the bolt and teeth on said flat portions of the nut for engaging those on the flat portions on the bolt.

In testimony whereof I affix my signature.

HENRY T. PASCOE.